United States Patent
Nomoto

(10) Patent No.: US 12,136,142 B2
(45) Date of Patent: Nov. 5, 2024

(54) INFORMATION PROCESSING APPARATUS, HEAD-MOUNTED DISPLAY APPARATUS, INFORMATION PROCESSING METHOD, AND NON-TRANSITORY COMPUTER READABLE MEDIUM

(71) Applicant: CANON KABUSHIKI KAISHA, Tokyo (JP)

(72) Inventor: Yuichi Nomoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/313,557

(22) Filed: May 8, 2023

(65) Prior Publication Data

US 2023/0410382 A1   Dec. 21, 2023

(30) Foreign Application Priority Data

May 23, 2022   (JP) .................................. 2022-083651

(51) Int. Cl.
*G06T 7/70* (2017.01)
*G06F 3/01* (2006.01)
*G06T 11/00* (2006.01)

(52) U.S. Cl.
CPC .............. *G06T 11/00* (2013.01); *G06F 3/013* (2013.01); *G06T 7/70* (2017.01); *G06T 2207/30196* (2013.01)

(58) Field of Classification Search
CPC . G06T 11/00; G06T 7/70; G06T 2207/30196; G06F 3/013; G06F 3/01; G06F 3/011; G06F 3/0304
See application file for complete search history.

(56) References Cited

U.S. PATENT DOCUMENTS

| | | | |
|---|---|---|---|
| 10,874,284 B2 | 12/2020 | Morimoto | |
| 2016/0018655 A1* | 1/2016 | Imoto | G06F 3/147 345/8 |
| 2017/0172381 A1* | 6/2017 | Morimoto | A61B 34/25 |
| 2017/0364153 A1* | 12/2017 | Kazansky | G06F 3/011 |
| 2018/0095635 A1* | 4/2018 | Valdivia | G02B 27/0093 |
| 2018/0136486 A1* | 5/2018 | Macnamara | G06F 1/163 |
| 2019/0004325 A1* | 1/2019 | Connor | G02B 27/0172 |
| 2022/0197379 A1* | 6/2022 | Shovman | G06V 20/20 |

FOREIGN PATENT DOCUMENTS

JP   2018-195319 A   12/2018

* cited by examiner

*Primary Examiner* — Temesghen Ghebretinsae
*Assistant Examiner* — K. Kiyabu
(74) *Attorney, Agent, or Firm* — Cowan, Liebowitz & Latman, P.C.

(57) ABSTRACT

An information processing apparatus according to the present invention includes at least one memory and at least one processor which function as: a control unit configured to cause a first display apparatus serving as a head-mounted display apparatus to display a virtual object such that the virtual object is combined with real space, and a first acquisition unit configured to acquire gaze information related to whether or not a user wearing a second display apparatus serving as a head-mounted display apparatus different from the first display apparatus gazes at a virtual object displayed by the second display apparatus, wherein the control unit causes the first display apparatus to display a specific virtual object based on the gaze information acquired by the first acquisition unit.

11 Claims, 6 Drawing Sheets

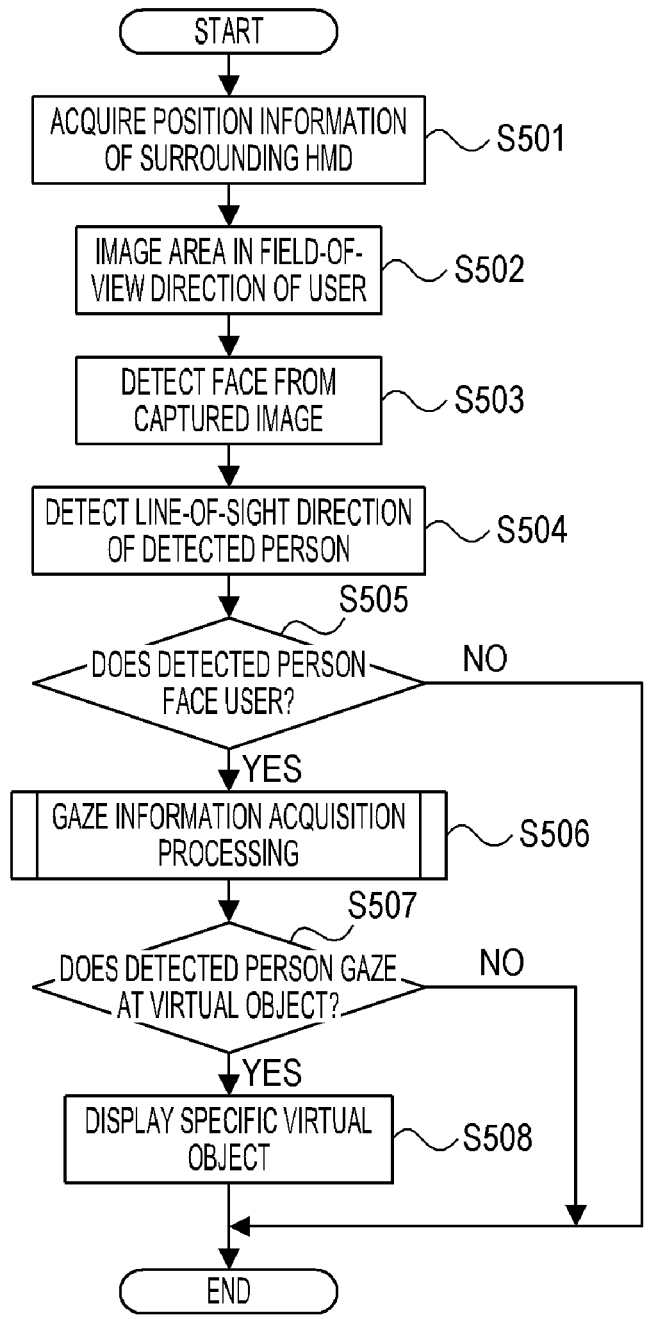

INFORMATION PROCESSING APPARATUS, HEAD-MOUNTED DISPLAY APPARATUS, INFORMATION PROCESSING METHOD, AND NON-TRANSITORY COMPUTER READABLE MEDIUM

BACKGROUND OF THE INVENTION

Field of the Invention

The present invention relates to an information processing apparatus, a head-mounted display apparatus, an information processing method, and a non-transitory computer readable medium.

Description of the Related Art

A head-mounted display apparatus which has a shape of eyeglasses or goggles and projects an image for augmented reality or mixed reality on a portion corresponding to a transmission lens, i.e., what is called a head-mounted display (HMD) is developed. In the HMD, a virtual object is displayed (projected) so as to be combined with (overlaid on) real space, and a user wearing the HMD can look at the virtual object as if the virtual object were actually present.

When such an HMD is widely used, it is considered that, like a smartphone, the HMD is used in an environment in which people are present around the user. In addition, when the size and weight of the HMD are reduced and it becomes impossible to distinguish between the HMD and eyeglasses, it becomes impossible to easily determine whether or not surrounding people use the HMDs.

Consideration will be given to the case where an HMD wearer A gazes at a virtual object (contents) in such a situation. In this case, when the virtual object is displayed so as to be overlaid on a person B positioned opposite the HMD wearer A, there are cases where a line-of-sight direction of the HMD wearer A is directed toward the person B unintentionally. As a result, the person B cannot determine whether or not the HMD wearer A uses the HMD, erroneously realizes that the HMD wearer A looks at the person B, and feels uneasy or unpleasant about the line of sight of the HMD wearer A.

Japanese Patent Application Publication No. 2018-195319 discloses a method of identifying, based on information on transition of a line of sight, an attention degree of a user to a virtual object which is identified based on the line of sight of the user.

However, even when the technique disclosed in Japanese Patent Application Publication No. 2018-195319 is used, it is not possible to alleviate an unpleasant feeling or the like caused by the line of sight of the surrounding HMD wearer.

SUMMARY OF THE INVENTION

The present invention provides a technique that alleviates an unpleasant feeling or the like caused by a line of sight of a surrounding HMD wearer.

The present invention in its first aspect provides an information processing apparatus including at least one memory and at least one processor which function as: a control unit configured to cause a first display apparatus serving as a head-mounted display apparatus to display a virtual object such that the virtual object is combined with real space, and a first acquisition unit configured to acquire gaze information related to whether or not a user wearing a second display apparatus serving as a head-mounted display apparatus different from the first display apparatus gazes at a virtual object displayed by the second display apparatus, wherein the control unit causes the first display apparatus to display a specific virtual object based on the gaze information acquired by the first acquisition unit.

The present invention in its second aspect provides an information processing apparatus including at least one memory and at least one processor which function as: a control unit configured to cause a head-mounted display apparatus to display a virtual object such that the virtual object is combined with real space; an acquisition unit configured to acquire line-of-sight information related to a line-of-sight direction of a user wearing the head-mounted display apparatus; a determination unit configured to determine whether or not the user gazes at the virtual object based on a display position of the virtual object and the line-of-sight information acquired by the acquisition unit, and an output control unit configured to perform control such that gaze information related to a determination result of the determination unit is output to outside.

The present invention in its third aspect provides a head-mounted display apparatus including: the above described information processing apparatus, and a display unit configured to display a virtual object so as to combine the virtual object with real space.

The present invention in its fourth aspect provides an information processing method including: a control step of causing a first display apparatus serving as a head-mounted display apparatus to display a virtual object such that the virtual object is combined with real space, and an acquisition step of acquiring gaze information related to whether or not a user wearing a second display apparatus serving as a head-mounted display apparatus different from the first display apparatus gazes at a virtual object displayed by the second display apparatus, wherein in the control step, the first display apparatus is caused to display a specific virtual object based on the gaze information acquired in the acquisition step.

The present invention in its fifth aspect provides an information processing method including: a control step of causing a head-mounted display apparatus to display a virtual object such that the virtual object is combined with real space; an acquisition step of acquiring line-of-sight information related to a line-of-sight direction of a user wearing the head-mounted display apparatus; a determination step of determining whether or not the user gazes at the virtual object based on a display position of the virtual object and the line-of-sight information acquired in the acquisition step, and an output control step of performing control such that gaze information related to a determination result of the determination step is output to outside.

The present invention in its sixth aspect provides a non-transitory computer readable medium that stores a program, wherein the program causes a computer to execute an information processing method including: a control step of causing a first display apparatus serving as a head-mounted display apparatus to display a virtual object such that the virtual object is combined with real space, and an acquisition step of acquiring gaze information related to whether or not a user wearing a second display apparatus serving as a head-mounted display apparatus different from the first display apparatus gazes at a virtual object displayed by the second display apparatus, wherein in the control step, the first display apparatus is caused to display a specific virtual object based on the gaze information acquired in the acquisition step. The present invention in its seventh aspect provides a non-transitory computer readable medium that stores a program, wherein the program causes a computer to execute an information processing method including: a control step of causing a head-mounted display apparatus to display a virtual object such that the virtual object is combined with real space; an acquisition step of acquiring line-of-sight information related to a line-of-sight direction of a user wearing the head-mounted display apparatus; a determination step of determining whether or not the user gazes at the virtual object based on a display position of the virtual object and the line-of-sight information acquired in the acquisition step, and an output control step of performing control such that gaze information related to a determination result of the determination step is output to outside.

Further features of the present invention will become apparent from the following description of exemplary embodiments with reference to the attached drawings.

BRIEF DESCRIPTION OF THE DRAWINGS

FIG. 5 is a flowchart showing an example of processing of the HMD according to Embodiment 1;

DESCRIPTION OF THE EMBODIMENTS

Embodiment 1

Figure 1:
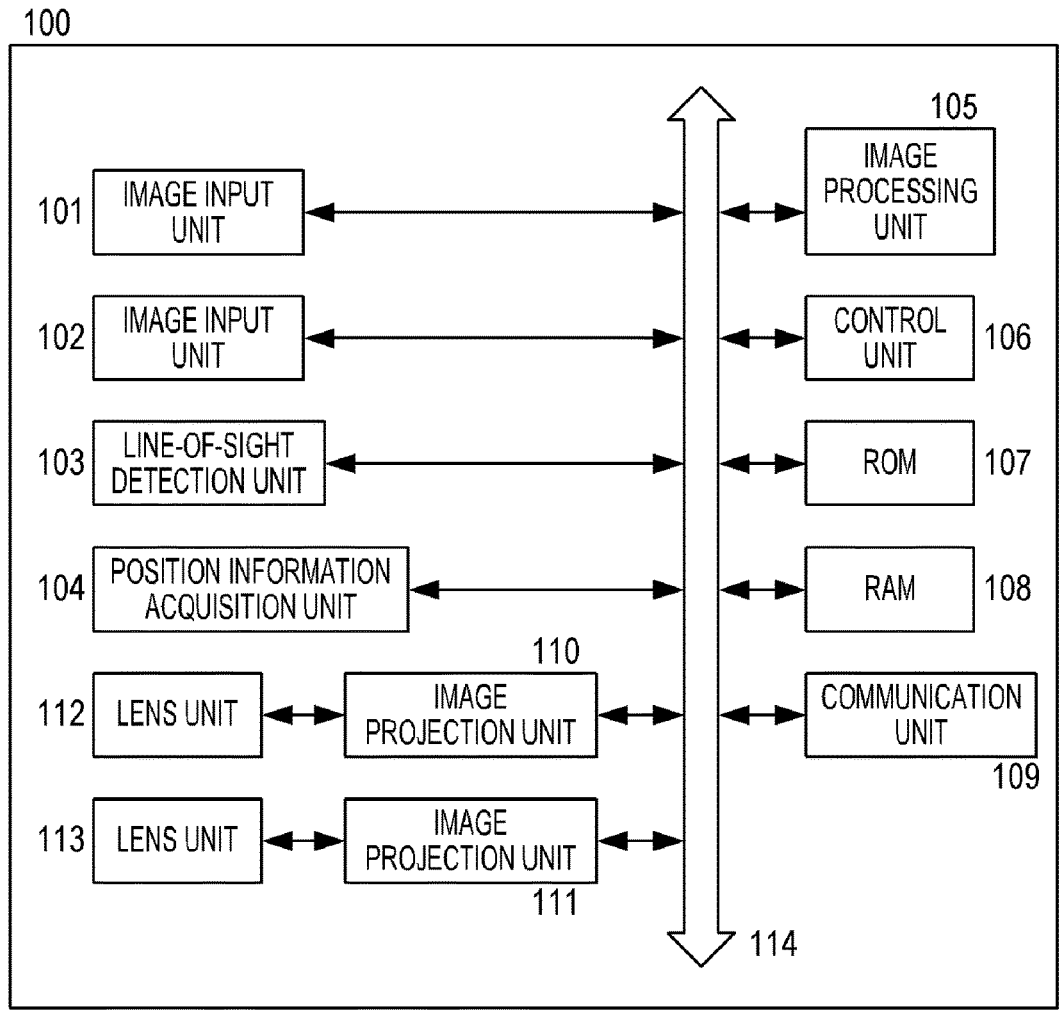
FIG. 1 is a block diagram showing an example of a configuration of an HMD.

Hereinbelow, Embodiment 1 of the present invention will be described. FIG. 1 is a block diagram showing an example of a configuration of a head-mounted display (HMD) 100 which is a head-mounted display apparatus according to Embodiment 1. The HMD 100 has image input units 101 and 102, a line-of-sight detection unit 103, a position information acquisition unit 104, an image processing unit 105, a control unit 106, a ROM 107, a RAM 108, a communication unit 109, image projection units 110 and 111, and lens units 112 and 113. These units are connected to each other via a bus 114. Note that the image processing unit 105, the control unit 106, the ROM 107, and the RAM 108 may also be provided in an information processing apparatus (e.g., a dedicated controller or a smartphone) which is separate from the HMD 100.

The image input unit 101 has a lens and an imaging element, and acquires an image (dynamic image) by imaging an area in a field-of-view direction of a left eye of a user who wears the HMD 100 (on his/her head). The image input unit 102 has a lens and an imaging element, and acquires an image (dynamic image) by imaging an area in a field-of-view direction of a right eye of the user who wears the HMD 100. Note that an example of a binocular HMD which captures left and right images with two image input units 101 and 102 has been described, but the present invention can also be applied to a monocular HMD which captures one image.

The line-of-sight detection unit 103 has a lens, an imaging element, and an image processing circuit, and detects line-of-sight directions of the right eye and the left eye of the user wearing the HMD 100. In addition, the line-of-sight detection unit 103 outputs line-of-sight information related to the detected line-of-sight directions. The line-of-sight information is, e.g., information indicative of the line-of-sight direction of the user wearing the HMD 100.

The position information acquisition unit 104 performs distance measurement and position measurement for a surrounding HMD, and acquires position information of the surrounding HMD. For example, the position information acquisition unit 104 acquires the position information by UWB (Ultra-Wide-Band) wireless communication. The position information acquisition unit 104 receives a wireless signal for position detection, and identifies the surrounding HMD by using a distance or an azimuth measured from an arrival time difference or a field intensity difference of the wireless signal, and an identifier.

The image processing unit 105 performs various image processing such as compression/expansion processing, white balance adjustment, interpolation, edge enhancement, gamma correction, or gradation conversion on images (image signals, image data) captured by the image input units 101 and 102. The image processing unit 105 detects a person (face) from the images captured by the image input units 101 and 102. Further, the image processing unit 105 detects the line-of-sight direction of the detected person (face) from the images captured by the image input units 101 and 102. Line-of-sight detection (detection of the line-of-sight direction) is a known technique, and hence the detailed description thereof will be omitted. According to the line-of-sight detection which uses a visible light camera, it is also possible to detect the line-of-sight direction of a person wearing eyeglasses and the line-of-sight direction of a person wearing an optical see-through HMD. The optical see-through HMD has, e.g., a lens similar to a lens of eyeglasses (see-through lens), and projects a virtual object on the lens. A user wearing the optical see-through HMD can directly look at real space via the lens. Further, the user can also look at the virtual object projected on the lens. In addition, the image processing unit 105 generates a virtual object (an image of a virtual object) for the left eye and a virtual object (an image of a virtual object) for the right eye. The image processing unit 105 may be implemented as a processing circuit or may also be implemented as a computer program which is executed by the control unit 106.

The control unit 106 acquires the line-of-sight information from the line-of-sight detection unit 103. Subsequently, the control unit 106 determines whether or not the user wearing the HMD 100 gazes at the virtual object based on the acquired line-of-sight information (the line-of-sight direction of the user wearing the HMD 100) and a display position of each virtual object generated by the image processing unit 105. In addition, the control unit 106 controls the individual devices connected to the bus 114 in a centralized manner. The ROM 107 stores various programs and various parameters. The RAM 108 is used as a main memory or a work area by the control unit 106. The control unit 106 loads a program or the like into the RAM 108 from the ROM 107 and executes the program loaded into the RAM 108, and various operations are thereby implemented.

The communication unit 109 is connected to and communicates with external equipment via a network. For example, the communication unit 109 performs Internet communication which uses TCP/IP.

The image projection unit 110 projects (displays) the virtual object for the left eye generated by the image processing unit 105 on the lens unit 112. The image projection unit 111 projects (displays) the virtual object for the right eye generated by the image processing unit 105 on the lens unit 113.

The lens unit 112 is mounted to the HMD 100 so as to be positioned at the front of the left eye of the user wearing the HMD 100, and has a see-through lens. The virtual object is projected on the see-through lens from the image projection unit 110, and the virtual object is thereby displayed so as to be combined with (overlaid on) the real space. The lens unit 113 is mounted to the HMD 100 so as to be positioned at the front of the left eye of the user wearing the HMD 100, and has a see-through lens. The virtual object is projected on the see-through lens from the image projection unit 111, and the virtual object is thereby displayed so as to be combined with (overlaid on) the real space. Note that the example of the binocular HMD in which left and right images are displayed on left and right lens units 112 and 113 by two image projection units 110 and 111 has been described, but (as described above) the present invention can also be applied to the monocular HMD which captures one image.

Figure 2:
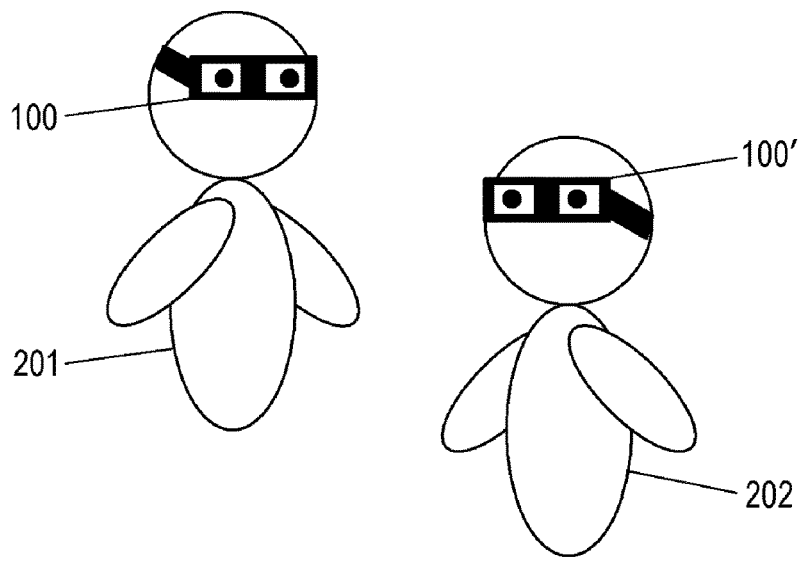
FIG. 2 is a schematic view showing an example of a use situation of the HMD.

FIG. 2 is a schematic view showing an example of a use situation of the HMD 100. In the situation in FIG. 2, a user 201 wearing the HMD 100 and a user 202 wearing an HMD 100' face each other. It is assumed that the HMD 100' has the same configuration as that of the HMD 100.

Figure 3A:
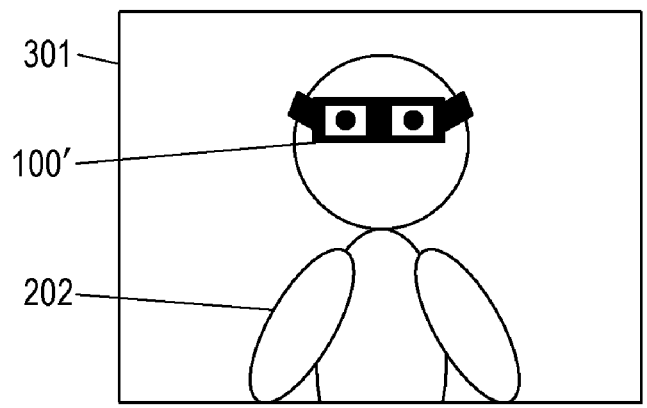
FIGS. 3A and 3B are views related to a field of view of a user wearing an HMD.
Figure 3B:
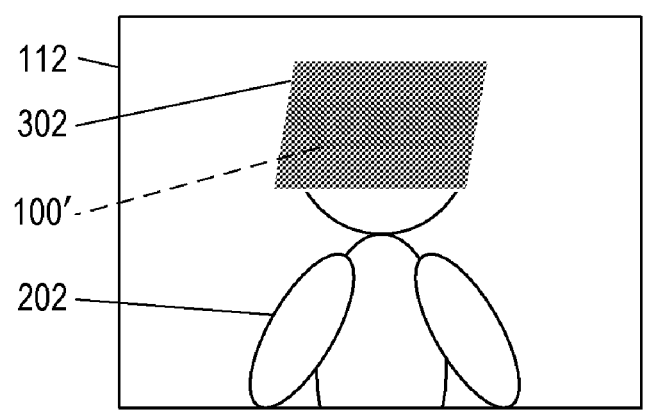

FIGS. 3A and 3B are views related to the field of view of the user 201 wearing the HMD 100. An image 301 shown in FIG. 3A is an image captured by the image input unit 101 of the HMD 100. As shown in FIG. 2, the user 201 and the user 202 face each other, and hence the user 202 is shown in the image 301. An image similar to the image 301 is captured by the image input unit 102 of the HMD 100. FIG. 3B will be described later.

Figure 4A:
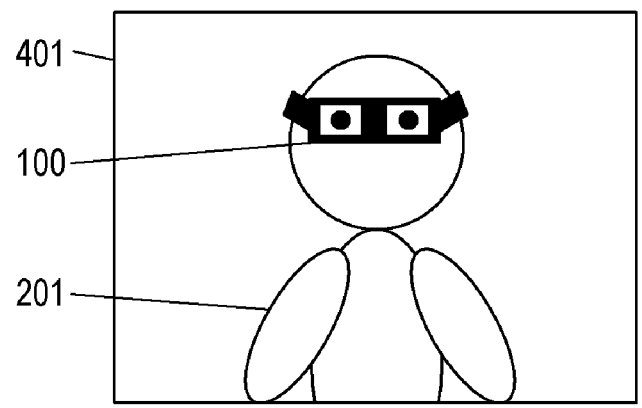
FIGS. 4A and 4B are views related to a field of view of a user wearing an HMD.
Figure 4B:
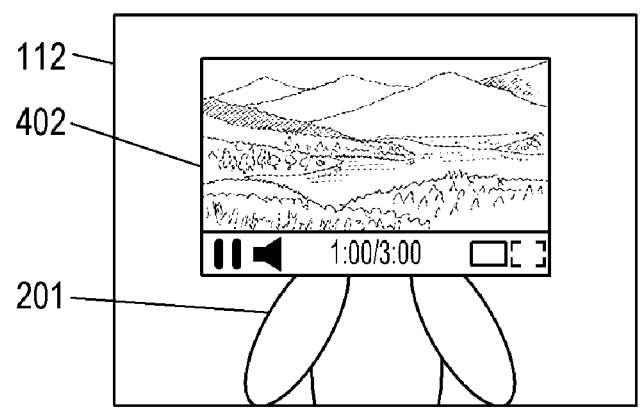

FIGS. 4A and 4B are views related to the field of view of the user 202 wearing the HMD 100'. An image 401 shown in FIG. 4A is an image captured by the image input unit 101 of the HMD 100'. As shown in FIG. 2, the user 201 and the user 202 face each other, and hence the user 201 is shown in the image 401. An image similar to the image 401 is also captured by the image input unit 102 of the HMD 100'.

FIG. 4B shows an area (the field of view of the user 202) which the user 202 can see through the lens unit 112 of the HMD 100'. A virtual object 402 is displayed on the lens unit 112. The virtual object 402 is displayed so as to be overlaid on the face of the user 201, and hence the user 202 can look at the virtual object 402 but cannot look at the face of the user 201. An area which the user 202 can see through the lens unit 113 of the HMD 100' is similar to that in FIG. 4B.

In the case where the user 202 looks at the virtual object 402, even when the user 202 does not look at the user 201, the line-of-sight direction of the user 202 is directed toward the user 201. Accordingly, when the face of the user 202 is included in the field of view of the user 201 as in the image 301 in FIG. 3A, the user 201 erroneously realizes that the user 202 looks at the user 201, and feels uneasy or unpleasant about the line of sight of the user 202.

To cope with this, in Embodiment 1, in the situations shown in FIGS. 3A, 4A, and 4B, as in FIG. 3B, the HMD 100 displays a specific virtual object 302. FIG. 3B shows an area (the field of view of the user 201) which the user 201 can see through the lens unit 112 of the HMD 100. The virtual object 302 is displayed on the lens unit 112. The virtual object 302 is displayed so as to be overlaid on the face of the user 202, and hence the user 201 can look at the virtual object 302 but cannot look at the face of the user 202. With this, it is possible to prevent the erroneous realization described above and alleviate the unpleasant feeling or the like described above.

FIG. 5 is a flowchart showing an example of processing of the HMD 100. For example, the control unit 106 of the HMD 100 loads a program or the like into the RAM 108 from the ROM 107 and executes the program loaded into the RAM 108, and the processing in FIG. 5 is thereby implemented.

In Step S501, the control unit 106 controls the position information acquisition unit 104 to identify an HMD around the HMD 100 and acquire the position information of the identified HMD. For example, the position information of the HMD 100' is acquired.

In Step S502, the control unit 106 controls the image input units 101 and 102 to acquire an image in which an area in the field-of-view direction of the user 201 wearing the HMD 100 is imaged. In addition, the control unit 106 controls the image processing unit 105 to perform various image processing on the acquired image. For example, the image 301 in FIG. 3A is acquired.

In Step S503, the control unit 106 controls the image processing unit 105 to detect a person (face) from the image acquired in Step S502. For example, the face of the user 202 wearing the HMD 100' is detected from the image 301 in FIG. 3A.

In Step S504, the control unit 106 controls the image processing unit 105 to detect the line-of-sight direction of the person (face) detected in Step S503 from the image acquired in Step S502. For example, the line-of-sight direction of the user 202 wearing the HMD 100' is detected from the image 301 in FIG. 3A.

In Step S505, the control unit 106 determines whether or not the line-of-sight direction detected in Step S504 is directed toward the user 201 wearing the HMD 100. In the case where the control unit 106 determines that the line-of-sight direction detected in Step S504 is directed toward the user 201, e.g., the line-of-sight direction of the user 202 wearing the HMD 100' is directed toward the user 201, the control unit 106 advances the processing to Step S506. In the case where the control unit 106 determines that the line-of-sight direction detected in Step S504 is not directed toward the user 201, e.g., the line-of-sight direction of the user 202 is not directed toward the user 201, the control unit 106 ends the processing in FIG. 5. Note that there are cases where a plurality of persons (a plurality of faces) are detected in Step S503 and the line-of-sight directions of the plurality of persons (the plurality of faces) are detected in Step S504. In these cases, in the case where the control unit 106 determines that at least any of the line-of-sight directions of the plurality of persons (the plurality of faces) is directed toward the user 201, the control unit 106 advances the processing to Step S506. In the case where the control unit 106 determines that none of the line-of-sight directions of the plurality of persons (the plurality of faces) is directed toward the user 201, the control unit 106 ends the processing in FIG. 5.

In Step S506, the control unit 106 acquires gaze information of the person identified in Step S505 (the person of which the line-of-sight direction is determined to be directed toward the user 201) from the HMD worn by the person. The HMD worn by the person identified in Step S505 is, e.g., the HMD of which the position information is acquired in Step S501, and the HMD is identified based on the processing result in Step S501 and the processing result in Step S505. In Step S506, for example, the gaze information of the user 202 is acquired from the HMD 100'. The gaze information is information related to whether or not a person wearing the HMD gazes at the virtual object, and is information indicating whether or not, e.g., the user 202 gazes at the virtual object displayed by the HMD 100'.

Thus, in Embodiment 1, the gaze information corresponding to the person who is present in the field of view of the user 201 and faces the user 201 is acquired.

Figure 6:
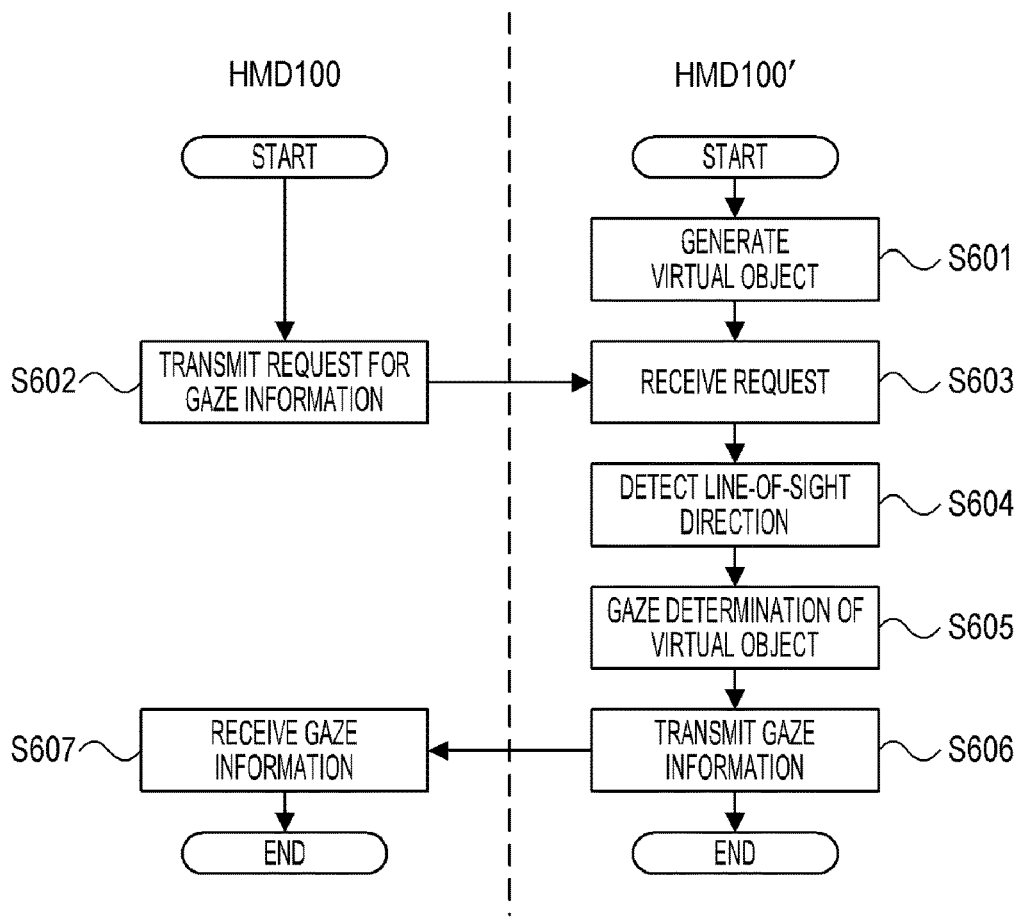
FIG. 6 is a flowchart showing an example of gaze information acquisition processing according to Embodiment 1.

FIG. 6 is a flowchart showing an example of processing (gaze information acquisition processing) in Step S506. FIG. 6 shows an example in the case where the person identified in Step S505 is the user 202, and the gaze information of the user 202 is acquired from the HMD 100'. FIG. 6 shows processing of the HMD 100 and processing of the HMD 100'.

In Step S601, the control unit 106 of the HMD 100' controls the image processing unit 105 and the image projection units 110 and 111 of the HMD 100' to generate and display a virtual object. For example, the virtual object 402 in FIG. 4B is displayed on each of the lens units 112 and 113.

In Step S602, the control unit 106 of the HMD 100 controls the communication unit 109 of the HMD 100 to transmit a request for the gaze information of the person (user 202) wearing the HMD 100' to the HMD 100'.

In Step S603, the control unit 106 of the HMD 100' controls the communication unit 109 of the HMD 100' to receive the request (the request for the gaze information) transmitted from the HMD 100 in Step S602.

In Step S604, the control unit 106 of the HMD 100' controls the line-of-sight detection unit 103 of the HMD 100' to detect the line-of-sight direction of the user 202.

In Step S605, the control unit 106 of the HMD 100' determines whether or not the user 202 gazes at the virtual object displayed in Step S601 based on the line-of-sight direction detected in Step S604. For example, the control unit 106 determines that the user 202 gazes at the virtual object in the case where the line-of-sight direction is directed toward the virtual object, and the control unit 106 determines that the user 202 does not gaze at the virtual object in the case where the line-of-sight direction is not directed toward the virtual object.

In Step S606, the control unit 106 of the HMD 100' controls the communication unit 109 of the HMD 100' to transmit the gaze information related to the determination result in Step S605 to the HMD 100 (external output).

In Step S607, the control unit 106 of the HMD 100 controls the communication unit 109 of the HMD 100 to receive the gaze information transmitted from the HMD 100' in Step S606.

Returning to the description of FIG. 5, in Step S507, the control unit 106 (of the HMD 100) determines whether or not the person identified in Step S505 gazes at the virtual object based on the gaze information acquired (received) in Step S506. In the case where the control unit 106 determines that the person identified in Step S505 gazes at the virtual object, e.g., the user 202 gazes at the virtual object displayed by the HMD 100', the control unit 106 advances the processing to Step S508. In the case where the control unit 106 determines that the person identified in Step S505 does not gaze at the virtual object, e.g., the user 202 does not gaze at the virtual object displayed by the HMD 100', the control unit 106 ends the processing in FIG. 5. In the situation in FIG. 4B, the line-of-sight direction of the user 202 is directed toward the user 201, but the user 202 looks at the virtual object 402, and does not look at the user 201. In such a situation, the processing is advanced to Step S508.

In Step S508, the control unit 106 controls the image processing unit 105 and the image projection units 110 and 111 to generate a specific virtual object and display the specific virtual object at a position based on the position of the person identified in Step S505. For example, as shown in FIG. 3B, the virtual object 302 is displayed at a position where the virtual object 302 is overlaid on eyes of the user 202. With this, it becomes impossible for the user 201 to visually recognize the eyes of the user 202.

Note that there are cases where it is determined that the line-of-sight direction of each of a plurality of persons (a plurality of faces) is directed toward the user 201 in Step S505. In these cases, the processing in Step S506 to Step S508 is performed on each of the plurality of persons (the plurality of faces).

In addition, the example in which the specific virtual object is not displayed in the case where the person identified in Step S505 does not gaze at the virtual object, and the specific virtual object is displayed in the case where the person gazes at the virtual object has been described, but the present invention is not limited thereto. For example, the specific virtual object may be displayed in each of the two cases. In this case, it may be made possible to determine whether or not the person identified in Step S505 gazes at the virtual object by making the type, form, and display pattern of the specific virtual object used in one of the two cases different from those used in the other case.

In addition, the example in which, after narrowing of the person (Step S505) is performed, the gaze information of the person is acquired (Step S506) has been described, but the present invention is not limited thereto. For example, the gaze information of all persons detected in Step S503 may be acquired from the outside, and narrowing of the gaze information may be performed based on the processing result (line-of-sight information) in Step S504.

Further, the example in which the gaze information is transmitted and received in both of the case where the person identified in Step S507 gazes at the virtual object and the case where the person identified therein does not gaze at the virtual object has been described, but the present invention is not limited thereto. For example, the gaze information may be transmitted and received only in one of the two cases.

In addition, the example in which the specific virtual object is displayed at the position where the specific virtual object is overlaid on the eyes of the person identified in Step S505 when viewed from the user 201 has been described, but the present invention is not limited thereto. For example, the specific virtual object may also be displayed at a position in the vicinity of (around) the person when viewed from the user 201 so as to be associated with the person identified in Step S505.

As described thus far, according to Embodiment 1, the specific virtual object is displayed based on the gaze information of the surrounding HMD wearer (whether or not the surrounding HMD wearer gazes at the virtual object). With this, it is possible to alleviate an unpleasant feeling or the like caused by the line of sight of the surrounding HMD wearer.

Embodiment 2

Hereinbelow, Embodiment 2 of the present invention will be described. In Embodiment 1, the example in which it is determined whether or not the line-of-sight direction is directed toward the user 201 and the gaze information is acquired has been described. In Embodiment 2, an example in which such a determination is not performed and the gaze information is acquired will be described. Note that the description of points (configurations and processing) similar to those in Embodiment 1 is appropriately omitted, and points different from those in Embodiment 1 will be described in detail.

Figure 7:
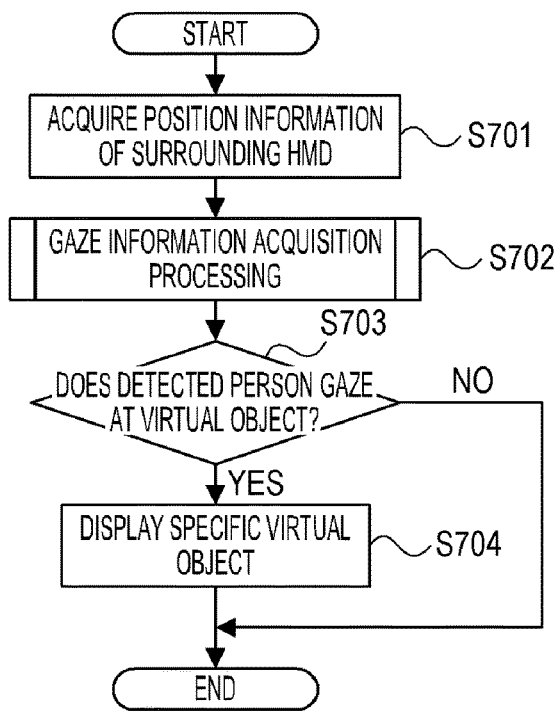
FIG. 7 is a flowchart showing an example of processing of the HMD according to Embodiment 2.

FIG. 7 is a flowchart showing an example of processing of the HMD 100 according to Embodiment 2. For example, the control unit 106 of the HMD 100 loads a program or the like into the RAM 108 from the ROM 107 and executes the program loaded into the RAM 108, and the processing in FIG. 7 is thereby implemented.

Processing in Step S701 is the same as the processing in Step S501 in Embodiment 1 (FIG. 5). In Step S702, the control unit 106 acquires the gaze information from the HMD corresponding to the position information acquired in Step S701 (the HMD of which the position information is acquired by the HMD 100). With this, for example, the gaze information corresponding to the person present in the field of view of the user 201 is acquired. Note that the same processing as the processing in Steps S502 and S503 in FIG. 5 may be performed and the gaze information of the detected person may be acquired.

Figure 8:
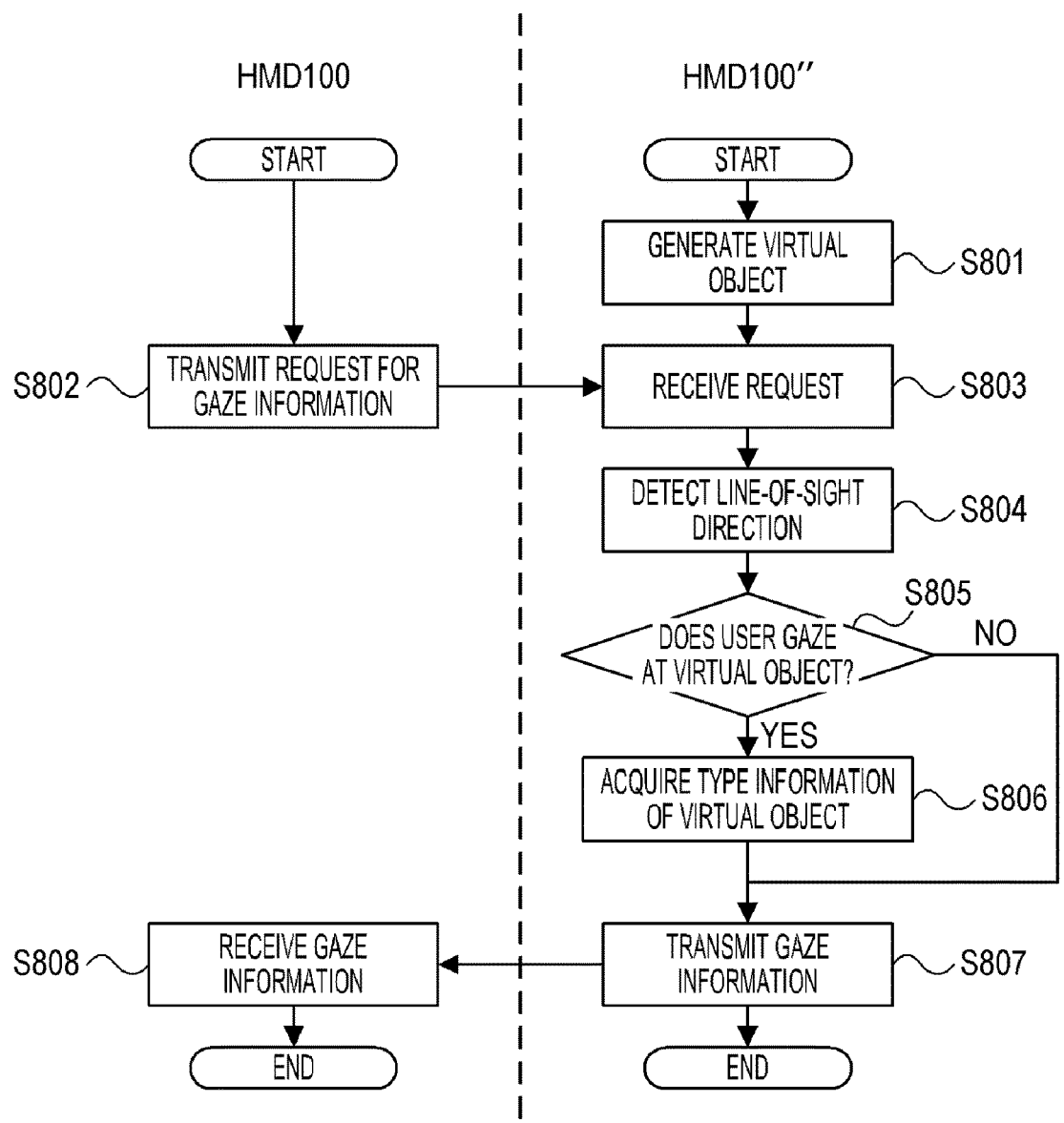
FIG. 8 is a flowchart showing an example of gaze information acquisition processing according to Embodiment 2.

FIG. 8 is a flowchart showing an example of processing in Step S702 (gaze information acquisition processing). FIG. 8 shows an example in the case where the HMD of which the position information is acquired in Step S701 is an HMD 100", and the gaze information is acquired from the HMD 100". In FIG. 8, processing of the HMD 100 and processing of HMD 100" are shown. It is assumed that the HMD 100" has the same configuration as that of the HMD 100.

Processing in Step S801 to Step S804 is the same as the processing in Step S601 to Step S604 in Embodiment 1 (FIG. 6).

In Step S805, similarly to Step S605, the control unit 106 of the HMD 100" determines whether or not the user gazes at the virtual object displayed in Step S801 based on the line-of-sight direction detected in Step S804. The control unit 106 of the HMD 100" advances the processing to Step S806 in the case where the control unit 106 determines that the user gazes at the virtual object, and the control unit 106 advances the processing to Step S807 in the case where the control unit 106 determines that the user does not gaze at the virtual object.

In Step S806, the control unit 106 of the HMD 100" generates (acquires) type information related to a type (e.g., a video, a still image, or text) of the virtual object which is determined to be the virtual object at which the user gazes in Step S805. The type information is, e.g., information indicative of the type of the virtual object. The type information may also be mode information related to an operation mode (application) corresponding to the virtual object. The mode information corresponding to the virtual object is, e.g., information indicative of the operation mode. Examples of the operation mode include a video mode in which a video is played in a window of the virtual object, a text mode in which text is displayed in the window of the virtual object, and a telephone mode in which an image of an intended party is displayed as the virtual object.

Processing in Steps S807 and S808 is the same as the processing in Steps S606 and S607 in Embodiment 1 (FIG. 6). However, in the case where the processing in Step S806 has been performed, the type information of the virtual object is included in the gaze information.

Returning to the description of FIG. 7, processing in Steps S703 and S704 is the same as the processing in Steps S507 and S508 in Embodiment 1 (FIG. 5). For example, the specific virtual object is displayed at the position where the specific virtual object is overlaid on the eyes of the person wearing the HMD (surrounding HMD wearer) of which the position information is acquired in Step S701. At this point, the control unit 106 (of the HMD 100) performs the same processing as, e.g., the processing in Steps S502 and S503 in FIG. 5, and determines the display position of the specific virtual object based on the processing result.

Figure 9:
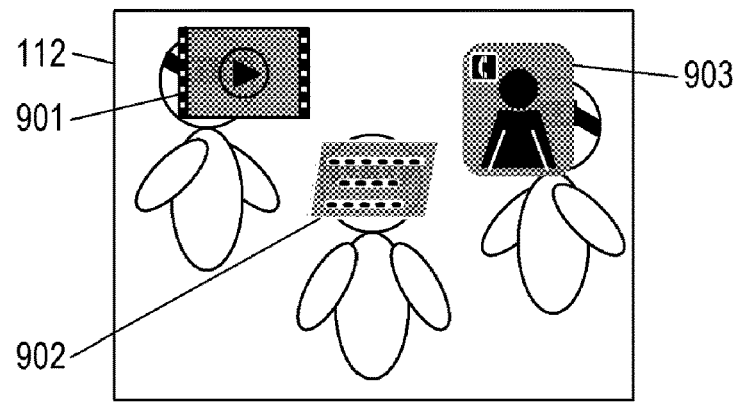
FIG. 9 is a schematic view showing examples of a virtual object according to Embodiment 2.

Note that, in Step S704, the control unit 106 displays the virtual object enabling identification of the type of the virtual object at which the surrounding HMD wearer gazes as the specific virtual object based on the received type information (the type information of the virtual object). As shown in FIG. 9, virtual objects 901 to 903 are displayed. FIG. 9 shows an area which the user 201 can see through the lens unit 112 of the HMD 100. The virtual object 901 indicates the video mode, and is displayed so as to be overlaid on a user who is viewing a video. The virtual object 902 indicates the text mode, and is displayed so as to be overlaid on a user who is reading text. The virtual object 903 indicates the telephone mode, and is displayed so as to be overlaid on a user who is talking on the telephone.

As described thus far, also in Embodiment 2, the specific virtual object is displayed based on the gaze information of the surrounding HMD wearer, and hence it is possible to alleviate the unpleasant feeling or the like caused by the line of sight of the surrounding HMD wearer. Further, according to Embodiment 2, the type information of the virtual object at which the surrounding HMD wearer gazes is included in the gaze information of the surrounding HMD wearer, and the virtual object which differs according to the type information is displayed as the specific virtual object. With this, it becomes possible for the user to easily grasp the virtual object at which the surrounding HMD wearer gazes.

Embodiments 1 and 2 are merely examples, and a configuration obtained by appropriately modifying or changing the configurations of Embodiments 1 and 2 within the scope of the gist of the present invention is included in the present invention. A configuration obtained by appropriately combining the configurations of Embodiments 1 and 2 is also included in the present invention.

For example, the example of the optical see-through HMD has been described, but the present invention can also be applied to a video see-through HMD. The video see-through HMD displays an image (virtual space) captured by imaging real space which is combined with a virtual object on an as-needed basis. A user wearing the video see-through HMD cannot look at the real space directly, but can look at the real space indirectly by looking at the displayed image.

According to the present invention, it becomes possible to alleviate the unpleasant feeling or the like caused by the line of sight of the surrounding HMD wearer.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-083651, filed on May 23, 2022, which is hereby incorporated by reference herein in its entirety.

What is claimed is:

1. An information processing apparatus comprising:
a processor; and
a memory storing a program which, when executed by the processor, causes the processor to
cause a first display apparatus serving as a head-mounted display apparatus to display a virtual object, such that the virtual object is combined with real space for a first user of the first display apparatus,
detect a line-of-sight direction of a person detected from an image obtained by imaging an area in a field-of-view direction of the first user wearing the first display apparatus, and
acquire gaze information related to whether or not a second user, wearing a second display apparatus serving as a head-mounted display apparatus different from the first display apparatus, gazes at a virtual object displayed by the second display apparatus to the second user, wherein the gaze information corresponding to a person whose detected line-of-sight direction is directed toward the first user wearing the first display apparatus, and who wears the head-mounted second display apparatus, is acquired,
in a case where the second user, wearing the second display apparatus, does not face the first user wearing the first display apparatus, the first display apparatus is not caused to display a specific virtual object to the first user, said specific virtual object overlaying at least in part the second user in the field of view of the first user wearing the first display apparatus, and
in a case where the second user, wearing the second display apparatus, faces the first user wearing the first display apparatus, the first display apparatus is caused to display the specific virtual object overlaying at least in part the second user in the field of view of the first user wearing the first display apparatus, based on the gaze information.

2. The information processing apparatus according to claim 1, wherein
the gaze information corresponding to a person, who is present in a field of view of the first user wearing the first display apparatus, is acquired.

3. The information processing apparatus according to claim 1, wherein
the gaze information corresponding to a person, who is present in a field of view of the first user wearing the first display apparatus and who faces the first user wearing the first display apparatus, is acquired.

4. The information processing apparatus according to claim 1, wherein
the program, when executed by the processor, further causes the processor to;
acquire position information of the head-mounted second display apparatus different from the first display apparatus, and
the gaze information corresponding to the person whose detected line-of-sight direction is directed toward the first user wearing the first display apparatus, and who wears the head-mounted second display apparatus, of which the position information is acquired, is acquired.

5. The information processing apparatus according to claim 1, wherein
the first display apparatus is caused to display the specific virtual object such that the specific virtual object is displayed at a position at least partially overlaying the position of the second user wearing the second display apparatus.

6. The information processing apparatus according to claim 1, wherein
the first display apparatus is caused to display the specific virtual object such that the specific virtual object is displayed at a position where the specific virtual object is overlaid over eyes of the second user, wearing the second display apparatus, when viewed by the first user wearing the first display apparatus.

7. The information processing apparatus according to claim 1, wherein
the first display apparatus is not caused to display the specific virtual object in a case where the second user, wearing the second display apparatus, does not gaze at the virtual object displayed by the second display apparatus, and
the first display apparatus is caused to display the specific virtual object in a case where the second user, wearing the second display apparatus, gazes at the virtual object displayed by the second display apparatus.

8. The information processing apparatus according to claim 1, wherein
in a case where the second user, wearing the second display apparatus, gazes at the virtual object displayed by the second display apparatus,
the gaze information includes information related to a type of the virtual object at which the second user, wearing the second display apparatus, gazes, and
the first display apparatus is caused to display a virtual object enabling identification of the type of the virtual object at which the second user, wearing the second display apparatus, gazes as the specific virtual object.

9. A head-mounted display apparatus comprising:
the information processing apparatus according to claim 1, and a display configured to display a virtual object so as to combine the virtual object with real space.

10. An information processing method comprising:

causing a first display apparatus serving as a head-mounted display apparatus to display a virtual object such that the virtual object is combined with real space for a first user of the first display apparatus, detecting a line-of-sight direction of a person detected from an image obtained by imaging an area in a field-of-view direction of the first user wearing the first display apparatus, and acquiring gaze information related to whether or not a second user, wearing a second display apparatus serving as a head-mounted display apparatus different from the first display apparatus, gazes at a virtual object displayed by the second display apparatus to the second user, wherein the gaze information corresponding to a person whose detected line-of-sight direction is directed toward the first user wearing the first display apparatus, and who wears the head-mounted second display apparatus, is acquired, in a case where the second user wearing the second display apparatus does not face the first user wearing the first display apparatus, the first display apparatus is not caused to display a specific virtual object to the first user, said specific virtual object overlaying at least in part the second user in the field of view of the first user wearing the first display apparatus, and in a case where the second user wearing the second display apparatus faces the first user wearing the first display apparatus, the first display apparatus is caused to display the specific virtual object overlaying at least in part the second user in the field of view of the first user wearing the first display apparatus, based on the gaze information.

11. A non-transitory computer readable medium that stores a program, wherein the program causes a computer to execute an information processing method comprising:

causing a first display apparatus serving as a head-mounted display apparatus to display a virtual object such that the virtual object is combined with real space for a first user of the first display apparatus, detecting a line-of-sight direction of a person detected from an image obtained by imaging an area in a field-of-view direction of the first user wearing the first display apparatus, and acquiring gaze information related to whether or not a second user, wearing a second display apparatus serving as a head-mounted display apparatus different from the first display apparatus, gazes at a virtual object displayed by the second display apparatus to the second user, wherein the gaze information corresponding to a person whose detected line-of-sight direction is directed toward the first user wearing the first display apparatus, and who wears the head-mounted second display apparatus, is acquired, in a case where the second user wearing the second display apparatus does not face the first user wearing the first display apparatus, the first display apparatus is not caused to display a specific virtual object to the first user, said specific virtual object overlaying at least in part the second user in the field of view of the first user wearing the first display apparatus, and in a case where the second user wearing the second display apparatus faces the first user wearing the first display apparatus, the first display apparatus is caused to display the specific virtual object overlaying at least in part the second user in the field of view of the first user wearing the first display apparatus, based on the gaze information.

* * * * *